United States Patent [19]

Wilson et al.

[11] Patent Number: 4,465,941
[45] Date of Patent: Aug. 14, 1984

[54] WATER ENGINE

[75] Inventors: Eric M. Wilson, Stockport; Geoffrey N. Bullock, Parbold, both of England

[73] Assignee: Aur Hydropower Limited, London, England

[21] Appl. No.: 359,759

[22] Filed: Mar. 19, 1982

[30] Foreign Application Priority Data

Mar. 26, 1981 [GB] United Kingdom ................. 8109477

[51] Int. Cl.³ .......................... F03B 13/12; F03B 9/00
[52] U.S. Cl. ........................................ 290/54; 290/42; 290/43; 290/53
[58] Field of Search ....................... 290/42, 43, 53, 54; 416/64, 79, 83

[56] References Cited

U.S. PATENT DOCUMENTS

| | | | |
|---|---|---|---|
| 984,266 | 2/1911 | Doney | 416/64 |
| 3,922,012 | 11/1975 | Herz | 290/54 X |
| 3,924,827 | 12/1975 | Lois | 416/64 X |
| 3,978,345 | 8/1976 | Bailey | 290/54 |
| 3,980,894 | 9/1976 | Vary et al. | 290/54 |
| 4,053,253 | 10/1977 | Coffer | 290/54 X |
| 4,053,787 | 10/1977 | Diggs | 290/54 |
| 4,170,738 | 10/1979 | Smith | 416/64 X |
| 4,184,805 | 1/1980 | Arnold | 416/64 X |
| 4,347,036 | 8/1982 | Arnold | 416/64 X |

FOREIGN PATENT DOCUMENTS

| | | | |
|---|---|---|---|
| 283459 | 4/1915 | Fed. Rep. of Germany | 416/64 |
| 2930531 | 2/1980 | Fed. Rep. of Germany | 290/53 |
| 68627 | 4/1914 | Switzerland | 416/64 |

Primary Examiner—J. V. Truhe
Assistant Examiner—Terry Flower
Attorney, Agent, or Firm—Kenyon & Kenyon

[57] ABSTRACT

A water engine has a barrage with a differential head of water on an upstream and downstream side. The engine has a working chamber and a double acting piston member in the chamber. Valves admit water into the working chamber from the upstream side of the barrage to the two working faces of the piston member in turn to cause horizontal reciprocal movement of the piston member, and the valves also allow water to flow out of the working chamber, on the downstream side of the barrage from that side of the piston member opposite that on which water is being admitted.

13 Claims, 9 Drawing Figures

WATER ENGINE

This invention relates to a water engine for extracting energy from a head of water, and has particular application as a tidal barrage or a river barrage.

According to the invention, there is provided a water engine for extracting energy from a head of water, including a barrage having a differential head of water on an upstream and downstream side, the engine comprising a working chamber, a water-driven double acting piston member arranged for horizontal reciprocal movement in the working chamber and means for admitting water from the upstream side of the barrage into the working chamber to two working faces of the piston member in turn, and for allowing water to flow to the downstream side of the barrage from the part of the working chamber on the side of the water-driven member opposite that on which water is being admitted, to cause the water-driven member to reciprocate in the working chamber.

The engine preferably comprises two or more working chambers each chamber including a double acting piston member, and each member preferably being attached to a common carriage. This simplifies power take-off, as a single means of energy take-off can be attached to the carriage, to extract power from all the working chambers.

Water may be admitted to the working chamber or a series of working chambers by means of a valve, for example a butterfly valve, having a first position in which water is admitted from the upstream side of the barrage into the working chamber, and a second position, enabling water to pass from the working chamber to the downstream side of the barrage. A third or intermediate position may be provided, in which water is allowed to pass directly through the barrage, without significant inhibition by the valve or valves.

In a preferred embodiment, a plurality of valves are disposed along the length of the barrage, and move in unison or near unison, and in so doing divert water into and out of working chambers between them. The movement of the valves in unison or near unison can be controlled by a common linkage, as will be described hereinafter, or by individual pneumatic or hydraulic activations with appropriate control valves.

The or each valve may have a non-planar profile such that rotation of the or each valve is effected at least partly by the flow of water through the engine.

The or each valve may be arranged asymmetrically with respect to the upstream and downstream sides of the barrage. Alternatively, the engine may comprise means for allowing the engine to operate when the head drop occurs in either direction across the barrage.

Power take-off from the engine may be by means of a hydraulic pump, arranged to pressurise hydraulic fluid on movement of the water driven member or members. For example, a hydraulic ram pump may be attached to the moveable carriage and a point fixed with respect to the barrage, such that movement of the carriage along the barrage results in successive extension and compression of the ram pump to generate hydraulic pressure. If more than one such pump working in parallel is provided, all, or only one or more of the pumps may be utilised as the force on the carriage varies with variation of the head of water available. This can be a useful feature in tidal applications, where the head of water may not be constant.

A preferred embodiment of the invention will now be described with reference to the accompanying drawings, in which.

Figure 1:
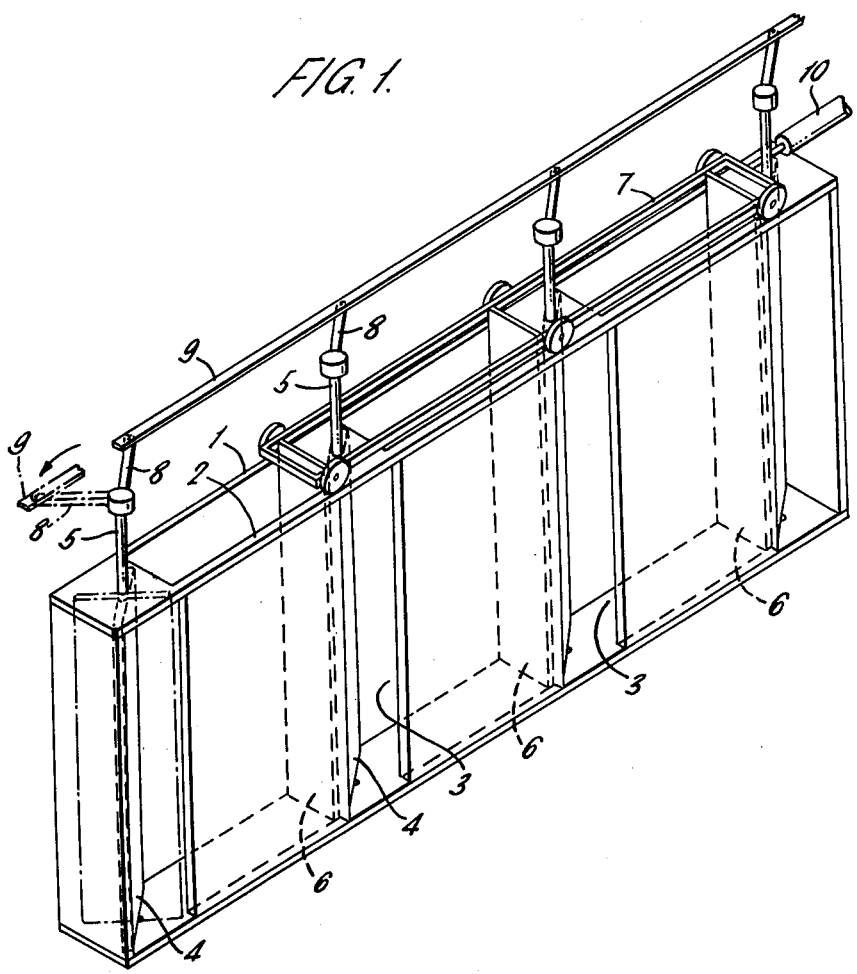
FIG. 1 is a schematic perspective view of an engine in accordance with the invention.

As can be seen, FIG. 1 is purely schematic, but serves to illustrate the type of mechanism which can be used, for example in tidal or river applications. A barrage has an upstream wall 1 and a downstream wall 2 defining between them working chambers 3.

Figure 2:
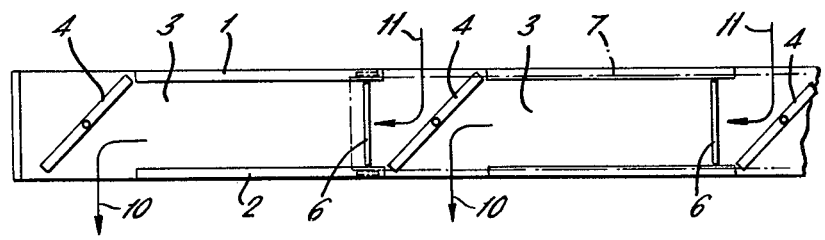
FIGS. 2 to 4 are schematic plan views of the engine of FIG. 1 in various stages of operation, the top part being omitted for clarity.
Figure 3:
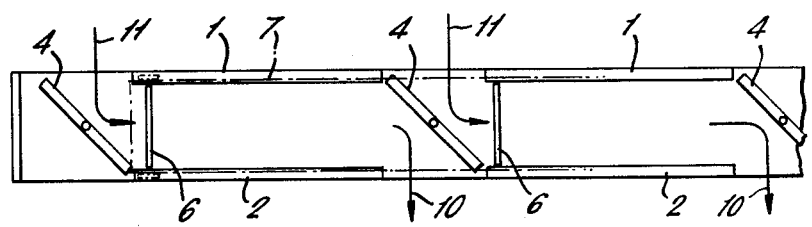

Water driven double acting piston members 6 are affixed to a wheeled carriage 7 which can move on its wheels between the positions shown in FIGS. 2 and 3. Butterfly valves 4 control the flow of water into and out of working chambers 3. The valves 4 are mounted for rotation on shafts 5 and are connected via cranks 8 to a connecting bar 9 so that the valves 4 move in unison.

A hydraulic ram pump 10 is attached at one of its ends to the carriage 7 and at its other end to a fixed point, such that reciprocal movement of the carriage along the top of the walls 1 and 2 causes the compression of hydraulic fluid in the ram pump 10. Various other ways may be provided of converting the movement of the carriage into hydraulic power. For example a lever arrangement may be provided to shorten the ram stroke and raise the pressure generated for a given movement of the carriage. Alternatively a profiled rail may be mounted on the carriage non-parallel with its direction of motion, such that the rail bears on a hydraulic ram to provide slow compression of the ram on movement of the carriage. The compressed hydraulic fluid can be used to drive a hydraulic motor, or hydraulic turbine for the generation of electricity. The compressed hydraulic fluid is also preferably used as a source of power to move valves 4 to control the flow of water into and out of the chambers 3.

The operating cycle of the machine is best described with reference to FIGS. 2, 3 and 4 of the drawings. In FIG. 2, the carriage 7, is at the right extreme of its traverse, and the valves 4 have just moved into the position shown. Water thus flows from the upstream side 11 of the barrage to fill the respective portions of the working chambers 3 to the right of each piston member 6, and thus drive the piston members 6 and with them the carriage 7, to the left, and expel water from the opposite ends of the working chambers to the downstream side 10 of the barrage. As the carriage moves, hydraulic fluid is compressed by the double acting ram pump 10 shown in FIG. 1.

As the valves 4 move to the position shown in FIG. 3, water is allowed to exit from the working chambers to the downstream side 10 of the barrage from the right side of each piston member 6, driven by water entering from the upstream side 11 of the barrage.

Figure 4:
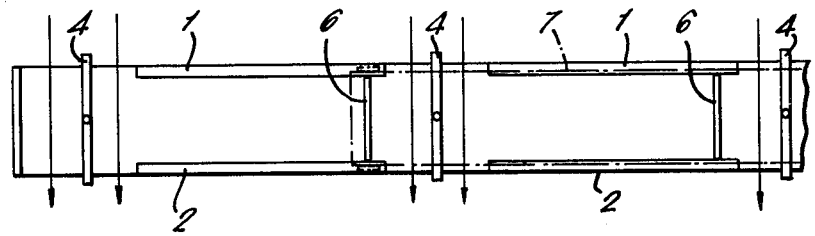

In the valve position shown in FIG. 4, water is allowed to flow directly through the barrage, affording an easy and convenient way of stopping the machine.

By arranging for movement of the carriage to cause opening and closing of the valves not into the positions shown in FIGS. 2 and 3, but into positions in between the FIG. 2 and 3 positions and that shown in FIG. 4, varying proportions of the water passing through the barrage can be used for power extraction. Thus the arrangement may be such that only small oscillations of the valves 4 about their center position takes place, in response to movement of the carriage 7, and this small oscillation is sufficient to generate the desired force on the piston members.

This mode of operation is particularly useful in tidal applications, in which very large volumes of water may be available, but at a head which varies throughout the tidal cycle. Thus, when large heads are available, valves 4 need only move by small amounts, allowing a relatively large amount of water to pass through the barrage, whereas when only small heads are available, the valves move between the FIG. 2 and FIG. 3 position, such that the greater proportion of the energy of the water flowing through the barrage is extracted.

Figure 5A:
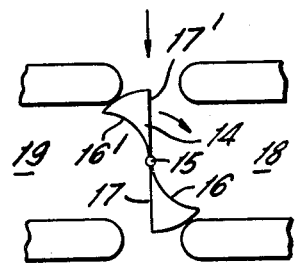
FIG. 5 shows three parts of a cycle of operation using a non-planar valve.
Figure 5B:
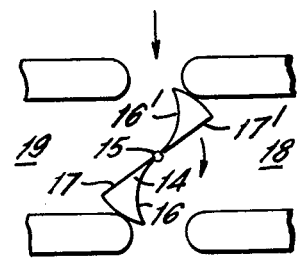
Figure 5C:
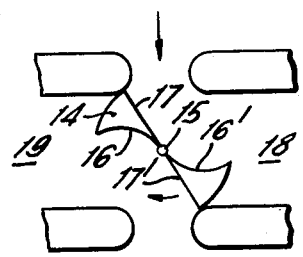

For applications in which water conservation is of more importance, for example in a river application, valves (4) may be arranged to move between the two positions shown in FIGS. 2 and 3, but through an intermediate position transverse to the water flow. Such a mode of operation will give rise to less water loss during the operation cycle. Alternatively, paddles of the valves 4 may be caused to rotate continuously during the operating cycle and may be in part or totally driven by the flow of water through the barrage. FIG. 5 shows diagrammatically a valve arrangement for using the flow of water through the barrage to rotate the valves. A valve 14 is pivoted centrally at 15, and on each side of the central part the valve has a curved face 16, 16' and a planar face 17, 17'. In a central position (FIG. 5a) flow of water acts on the valve to turn the valve 14 clockwise. This causes a switch in engine operation as right hand chamber 18 changes from filling to emptying, and left hand chamber changes from emptying to filling (FIG. 5b). Rotation of the valve 14 continues until the engine operation is switched again (FIG. 5c). The particular form of valve employed in not critical, and any known form of valve may be used capable of allowing the desired water flows. It will of course be appreciated that the arrangement shown has the advantage that a single valve serves two working chambers.

An advantage of the arrangement shown is that the force produced on the carriage is substantially linear over the working cycle.

It should also be appreciated that the engine described above is reversible, in that either wall 1 or wall 2 may be on the upstream side. This renders the engine particular suitable for tidal applications. Because high efficiencies can be obtained with heads as low as a few feet, an engine of the type described has wide application in estuaries and the like, where the tidal rise and fall is relatively low.

Figure 6A:
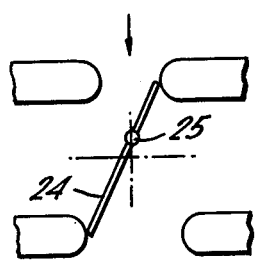
FIG. 6 shows two positions of an asymmetrically arranged valve.
Figure 6B:
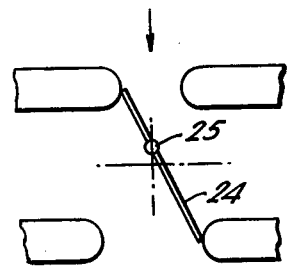

For applications in which the upstream side is always the same side of the barrage some asymmetry can be introduced into the overall arrangement with a view to improving the engine's performance. FIG. 6 illustrates an offset pivot arrangement. A valve 24 is pivoted at 25 such that the length of the valve 24 on the downstream side of the pivot 25 is greater than the length of the valve 24 on the upstream side of the pivot. This arrangement causes the valve 24 to require less energy to switch the valve 24 between the positions shown in FIG. 6a and FIG. 6b.

We claim:

1. A water engine comprising a barrage having a differential head of water between upstream and downstream sides, the barrage having defined therein a working chamber, a water-driven double-acting piston member arranged for horizontal reciprocal movement in the working chamber and valve means for admitting water from the upstream side of the barrage into the working chamber to the two working faces of the piston member in turn, and for allowing water to flow to the downstream side of the barrage from the part of the working chamber on the side of the water-driven member opposite that on which water is being admitted, thereby to cause the water-driven member to reciprocate back and forth in the working chamber.

2. An engine as claimed in claim 1 wherein the valve means for admitting water to the working chamber includes a valve having a first position enabling water to pass from the upstream side of the barrage into the working chamber, and a second position, enabling water to pass from the working chamber to the downstream side of the barrage.

3. An engine as claimed in claim 2 wherein the valve has a third position enabling direct flow of water from the upstream to the downstream side of the barrage.

4. An engine as claimed in claim 2 wherein the valve is a butterfly valve or a rotary valve.

5. An engine as claimed in claim 2 including a plurality of the said valves.

6. An engine as claimed in claim 1 comprising a plurality of working chambers, each chamber being provided with a water-driven double-acting piston member, and each member being attached to a common carriage.

7. An engine as claimed in claim 2 wherein the valve has a non-planar profile such that rotation of the valve is effected at least partly by the flow of water through the engine.

8. An engine as claimed in claim 2 wherein the valve is arranged asymmetrically with respect to the upstream and downstream sides of the barrage.

9. An engine as claimed in claim 2 comprising means for allowing the engine to operate when the head drop occurs in either direction across the barrage.

10. An engine as claimed in claim 1 including a hydraulic pump to generate pressure in a hydraulic fluid on movement of the water-driven member.

11. An engine as claimed in claim 6 including a hydraulic pump in the form of a ram connected at one of its ends to the movable carriage and at the other end to a fixed point, to generate pressure in a hydraulic fluid on movement of the water-driven member.

12. A water engine for extracting energy from a head of water, including a barrage having a differential head of water on an upstream and downstream side, the engine comprising a working chamber, a water-driven double-acting piston member arranged for horizontal reciprocal movement in the working chamber and means for admitting water from the upstream side of the barrage into the working chamber to two working faces of the piston member in turn, and for allowing water to flow to the downstream side of the barrage from the part of the working chamber on the side of the water-driven member opposite that on which water is being admitted, to cause the water-driven member to reciprocate in the working chamber, said means for admitting water to the working chamber including a valve having a first position enabling water to pass from the upstream side of the barrage into the working chamber, and a second position, enabling water to pass from the working chamber to the downstream side of the barrage, and means for allowing the engine to operate when the head drop occurs in either direction across the barrage.

13. A water engine for extracting energy from a head of water, including a barrage having a differential head of water on an upstream and downstream side, the engine comprising a working chamber, a water-drive double-acting piston member arranged for horizontal reciprocal movement in the working chamber and means for admitting water from the upstream side of the barrage into the working chamber to two working faces of the piston member in turn, and for allowing water to flow to the downstream side of the barrage from the part of the working chamber on the side of the water-driven member opposite that on which water is being admitted, to cause the water-driven member to reciprocate in the working chamber, and a hydraulic pump to generate pressure in a hydraulic fluid on movement of the water-driven member.

* * * * *